United States Patent
Han et al.

(10) Patent No.: US 6,415,500 B1
(45) Date of Patent: Jul. 9, 2002

(54) METHOD TO PREVENT ELECTROSTATIC DISCHARGE FOR MR/GMR WAFER FABRICATION

(75) Inventors: Cherng-Chyi Han; Mao-Min Chen; Jen-Wei Koo; Rodney Lee; Li-Yan Zhu, all of San Jose; Jei-Wei Chang, Cupertino, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/482,050

(22) Filed: Jan. 13, 2000

(51) Int. Cl.⁷ .......................... G11B 5/127; H04R 31/00
(52) U.S. Cl. .................. 29/603.14; 29/603.15; 29/603.16; 29/847; 29/852; 360/323
(58) Field of Search .................. 29/603.14, 603.15, 29/603.16, 847, 852; 360/323

(56) References Cited

U.S. PATENT DOCUMENTS

| | | | |
|---|---|---|---|
| 4,802,043 A | 1/1989 | Sato et al. ................ 360/113 |
| 5,272,582 A | * 12/1993 | Shibata et al. .......... 360/113 |
| 5,375,022 A | * 12/1994 | Gill et al. ................. 360/113 |
| 5,465,186 A | 11/1995 | Bajorek et al. .......... 360/113 |
| 5,491,605 A | 2/1996 | Hughbanks et al. ..... 360/113 |
| 5,539,598 A | 7/1996 | Denison et al. ......... 360/113 |
| 5,699,212 A | 12/1997 | Erpelding et al. ....... 360/104 |
| 5,757,590 A | 5/1998 | Phipps et al. ........... 360/113 |
| 5,784,772 A | * 7/1998 | Ewasko et al. ......... 29/603.15 |
| 5,923,504 A | * 7/1999 | Araki et al. ............. 360/113 |
| 5,945,190 A | * 8/1999 | Sato ....................... 428/65.3 |
| 5,978,181 A | * 11/1999 | Niijima et al. ........... 360/113 |
| 6,071,607 A | * 6/2000 | Okuyama et al. ....... 428/332 |
| 6,219,206 B1 | * 4/2001 | Odai et al. .............. 360/320 |
| 6,297,903 B1 | * 7/2001 | Watanuki ................ 216/22 |
| 6,284,107 B1 | * 9/2001 | Zhu et al. ............... 204/192.2 |
| 6,288,880 B1 | * 9/2001 | Hughbanks et al. .... 360/323 |
| 6,305,072 B1 | * 10/2001 | Yoda et al. ............. 29/603.14 |
| 6,325,900 B1 | * 12/2001 | Komuro et al. ......... 204/192.2 |

* cited by examiner

Primary Examiner—Peter Vo
Assistant Examiner—Paul D Kim
(74) Attorney, Agent, or Firm—George O. Saile; Stephen B. Ackerman

(57) ABSTRACT

Methods and structures are disclosed which avoid electrostatic charge build up and subsequent electrostatic discharge (ESD) during the wafer fabrication process of magnetoresistive (MR) or giant magnetoresistive (GMR) read/write heads of magnetic disk drives. This is achieved by designing the wafer layout and process so that the MR/GMR sensor film is shorted to the magnetic shields of the head through shorting paths so that there is an equal potential between MR/GMR sensor film and magnetic shields during the entire fabrication process.

23 Claims, 11 Drawing Sheets

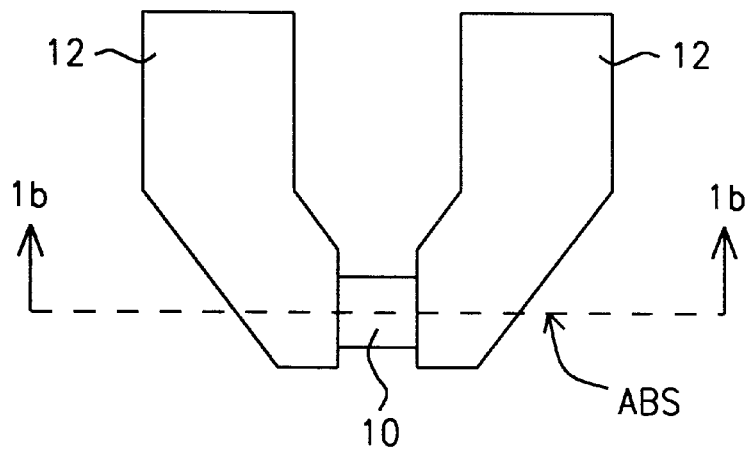
FIG. 1a – Prior Art
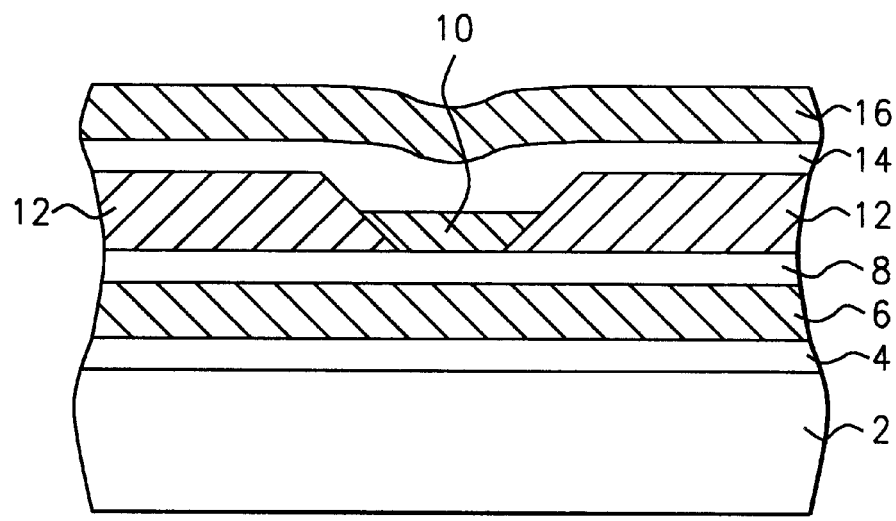
FIG. 1b – Prior Art

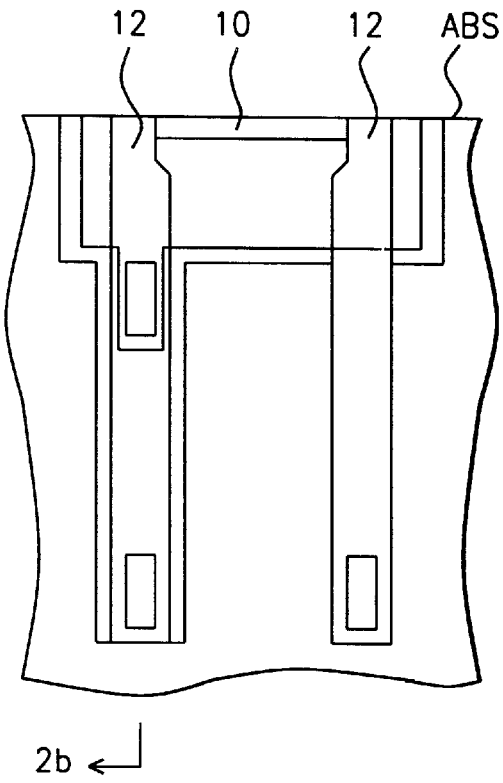
FIG. 2a – Prior Art
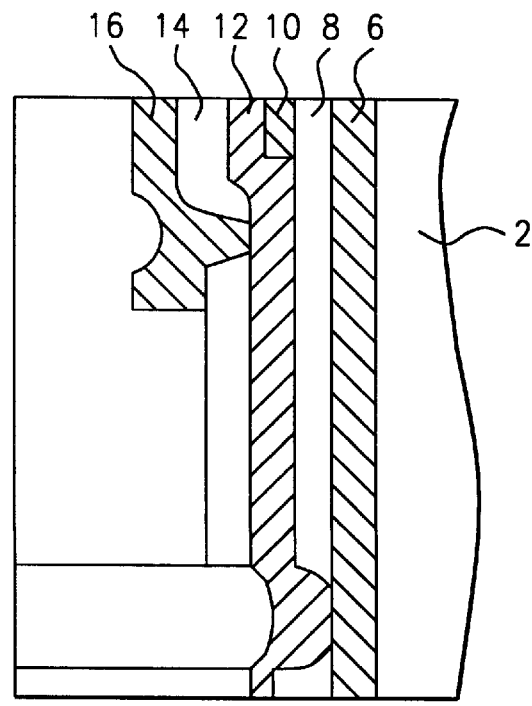
FIG. 2b – Prior Art

METHOD TO PREVENT ELECTROSTATIC DISCHARGE FOR MR/GMR WAFER FABRICATION

BACKGROUND OF THE INVENTION

1. Field of the Invention

The invention relates to protecting read/write heads of magnetic disk drives from electrostatic discharge (ESD) during manufacture, and more particularly to methods and a structure for preventing dielectric breakdown during magnetoresistive (MR) and giant magnetoresistive (GMR) head fabrication.

2. Description of the Related Art

In a state-of-the-art magnetic disk drive a magnetic transducer, referred to as a read/write head, is formed integrally with a "slider". The slider flies over a rotating disk, thus allowing the read/write head to record/retrieve information to and from a thin film of magnetic medium, which is coated on the disk. The read portion of the transducer, referred to as a read head, consists of a thin layer of MR or GMR sensor stripe sandwiched between two magnetic shields. A constant current is passed through the sensor stripe, whose resistance varies in response to a previously recorded magnetic pattern. Thus a corresponding varying voltage is detected across the sensor stripe. The magnetic shields help the sensor stripe to focus on a narrow region of the magnetic medium, hence improving the spatial resolution of the read head. The space between the shields is called the read gap.

The magnetic shields are electrically conductive. To prevent the sensing current from leaking into the shields, a thin dielectric film insulates the sensor stripe from each shield. However, if the electric potentials differ sufficiently across any of the two dielectric films, the dielectric film will break down, and the read head will be destroyed. Such undesirable destruction occurs quite often in the fabrication of read heads for two reasons. First, the sensor stripe and the shields are deposited and patterned by electrical processes in the vacuum, such as sputtering or ion-beam. Static charge inevitably builds up on all isolated surfaces. Thus an electrostatic field exists between isolated conductors situated at different depth of the wafer, for example between the sensor stripe and the shields. Attempts to neutralize the static surface charge are tedious, costly, and with limited success. Secondly, the read gap is extremely thin (for example, about 150 nm, where n stands for nano or $10^{-9}$) in the state-of-the-art read/write heads, in order to achieve high resolution. Correspondingly, the dielectric films are even thinner (for example, a mere 20 nm). These dielectric films can break down under a few volts, and cause electrostatic discharge (ESD) which permanently damages the read sensor. As the magnetic recording technology advances, the dielectric films continue to become thinner and more susceptible to the static charge buildup and dielectric breakdown.

The read/write heads are produced en masse in the form of a wafer. Typically each wafer contains over 10,000 heads. A finished wafer is subsequently cut into rows and further diced into sliders. The surface of a read/write head facing the disk medium, known as the air bearing surface (ABS), is created when the wafer is cut into rows. The ABS is subsequently polished to achieve a precise MR stripe height, and etched to form an intricate pattern which is needed in order for the slider to fly on the disk. A finished slider is mounted on an elastic structure, referred to as a suspension. The suspension is then assembled into a disk drive. In each of the above processes, a read head is susceptible to ESD.

Even in a finished disk drive, the performance of a read/write head can be adversely affected by static charge buildup on the magnetic medium. Numerous workers in the field have sought solutions to these problems, as demonstrated by the following U.S. patents:

U.S. Pat. No. 5,465,186 (Bajorek et al.) teaches a method for shunting MR by soldering the lead terminals at the slider surface, thereby diverting transient current during ESD events.

U.S. Pat. No. 5,491,605 (Hughbanks et al.) shows the leads of the MR read head and inductive write head shunted together and connected to the slider substrate through a conductive layer at the ABS.

U.S. Pat. No. 5,699,212 (Erpelding et al.) places solder shunts across adjacent leads of the MR read head, on the suspension. In this and the above two patents, the shunts must be removed before operation of the read/write head.

U.S. Pat. No. 5,757,590 (Phipps et al.) describes removable fusible-links to shunt the MR sensor stripe. The shunts can be opened by electrical means.

U.S. Pat. No. 5,539,598 (Denison et al.) teaches an arrangement wherein each magnetic shield is connected to a ground lead of the MR sensor, through a resistor deposited with the MR sensor stripe.

U.S. Pat. No. 4,802,043 (Sato et al.) describes connections between a sensor stripe and both magnetic shields, through an electrical lead.

Note that U.S. Pat. Nos. 5,465,186, 5,491,605, 5,699,212, and 5,757,590 alleviate problems caused by static buildup after wafer fabrication. None of them provides any protection against static buildup during wafer fabrication of the MR or GMR read heads. U.S. Pat. Nos. 5,539,598 and 4,802,043 do describe electrical connections between the sensor stripe and the shields within the wafer. However, the connections are established too late in the wafer fabrication. In both U.S. Pat. Nos. 5,539,598 and 4,802,043, the sensor stripe and the shields are deposited and patterned as isolated conductors before they are connected to each other. In the state-of-the-art MR/GMR sensors, the dielectric films are too thin to withstand the static charge buildup during the deposition and patterning of the sensor stripe and the second (upper) magnetic shield. The dielectric films often break down before the sensor stripe is connected to either shield. Therefore, the patents cited above did not solve the problem of dielectric breakdown during wafer process.

In addition, U.S. Pat. Nos. 5,539,598 and 4,802,043 establish permanent electrical connections between the MR sensor and two magnetic shields. In some applications, the sensor stripe must be isolated from the shields before the slider is assembled into a disk drive. This is usually due to the concern that electrical noise from the write head may couple capacitively into the shields. For these applications, the permanent connections described in U.S. Pat. Nos. 5,539,598 and 4,802,043 are unacceptable. A removable MR-to-shield connection is needed to provide ESD protection during wafer fabrication and slider processes.

SUMMARY OF THE INVENTION

It is an object of the present invention to provide methods and a structure to avoid dielectric breakdown during the wafer fabrication of MR or GMR read heads of magnetic disk drives.

Another object of the present invention is to avoid dielectric breakdown, without excessively stringent requirements on charge neutralization during wafer fabrication of MR or GMR read heads.

A further object of the present invention is to provide methods and a structure for the manufacture of MR or GMR read heads having an isolated read-stripe free of defects from dielectric breakdown.

These objects have been achieved by depositing the sensor stripe and the magnetic shields contiguously as an integral conductor. In the present invention, the sensor stripe and the magnetic shields are never electrically isolated from each other during the entire wafer process. The sensor stripe and the magnetic shields are always kept in equipotential. Therefore, the risk of dielectric breakdown is eliminated. The electrical connections between the sensor stripe and the magnetic shields are severed only after the wafer process is complete.

BRIEF DESCRIPTION OF THE DRAWINGS

FIG. 1 a shows a plan view of a MR/GMR sensor of the prior art.

FIG. 1b shows a cross-section of the MR/GMR sensor in FIG. 1a, with abutted leads.

FIG. 2a shows a plan view of a MR sensor of U.S. Pat. No. 4,802,043.

FIG. 2b shows a cross-section of the MR sensor in FIG. 2a. The MR sensor is formed in isolation before it is connected to the first magnetic shield.

DESCRIPTION OF THE PREFERRED EMBODIMENT

Figure 3A:
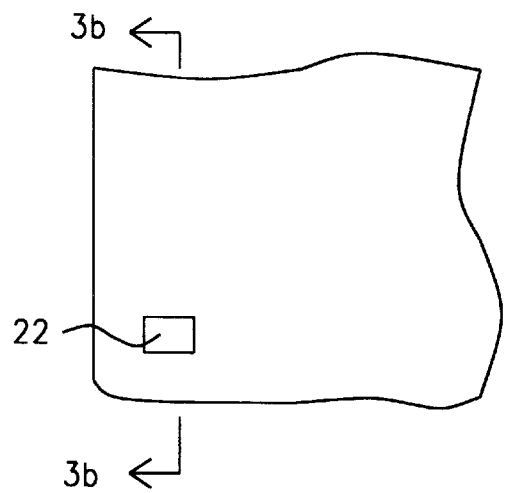
FIGS. 3a through 3l illustrate the process flow of the first preferred embodiment of the present invention.

We now describe the present invention contrasting it with the prior art. Typical prior art MR/GMR heads are shown in FIG. 1a and FIG. 1b. FIG. 1a shows a plan view of a head with sensor stripe 10 between leads 12. FIG. 1b is the cross-section 1b–1b of FIG. 1a showing a substrate 2, which is followed by: an insulating film 4, a first magnetic shield 6, a thin dielectric film 8, a MR/GMR sensor stripe 10, leads 12, another dielectric film 14, and a second magnetic shield 16. In the prior state-of-the-art MR/GMR heads, as shown in FIG. 1a and FIG. 1b, the MR/GMR sensor stripe 10 and magnetic shields 6 and 16 are built and maintained separately as isolated structures. It is a disadvantage that the dielectric films 8 and 14 of the prior state-of-the-art MR/GMR heads are vulnerable to breakdown during the wafer process. U.S. Pat. No. 4,802,043 describes a method and structure, in which the sensor stripe 10 and the first magnetic shield 6 are built as separate conductors before being connected together.

Figure 4A:
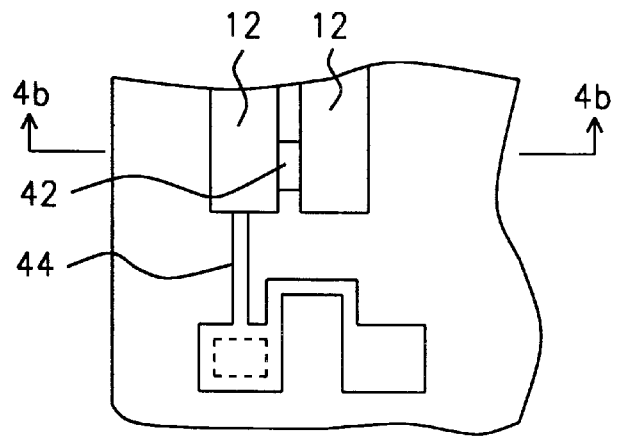
FIG. 4a shows the plan view of a MR/GMR head immediately before lead deposition.
Figure 4B:
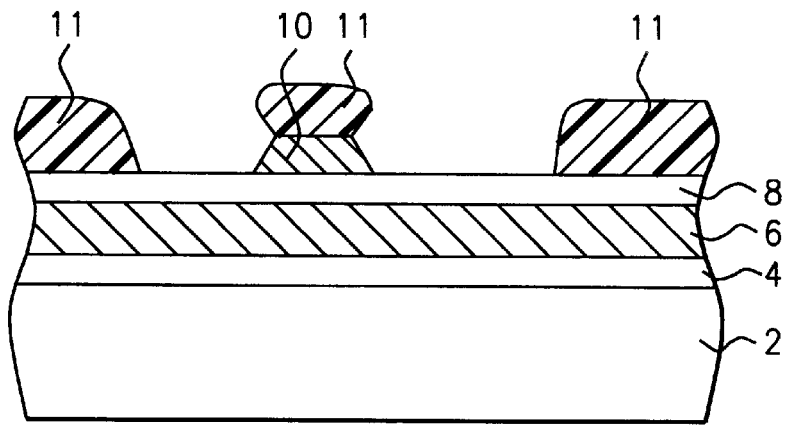
FIG. 4b shows a cross section of the MR sensor in FIG. 4a. The MR/GMR sensor stripe is temporarily isolated from the first shield.

FIG. 2a and FIG. 2b are figures adapted from FIG. 4a and FIG. 4b of U.S. Pat. No. 4,802,043 showing, in FIG. 2a, sensor stripe 10, leads 12, and the air bearing surface (ABS). FIG. 2b is the cross-section 2b—2b of FIG. 2a and shows the same sequence of layers as FIG. 1b except that insulating film 4 is omitted, and where the same numerals in FIGS. 1a/b and FIGS. 2a/b indicate the same item. Referring again to FIG. 2a and FIG. 2b, it is similarly disadvantageous that the dielectric film 8 is susceptible to breakdown before the connection is established. In the present invention, the sensor stripe 10 and shields 6, 16 are built contiguously as an integral conductive structure, as described below in detail.

Figure 3B:
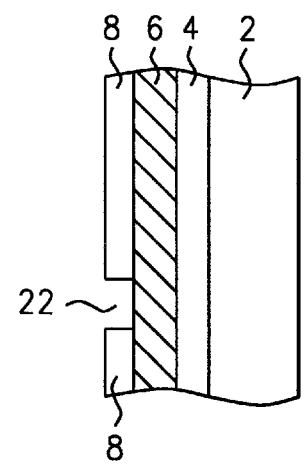
Figure 3C:
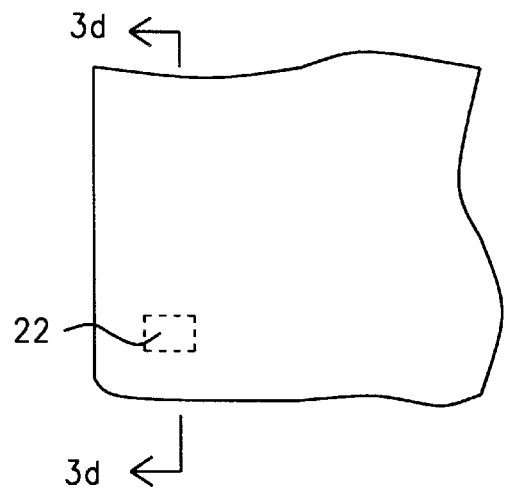
Figure 3D:
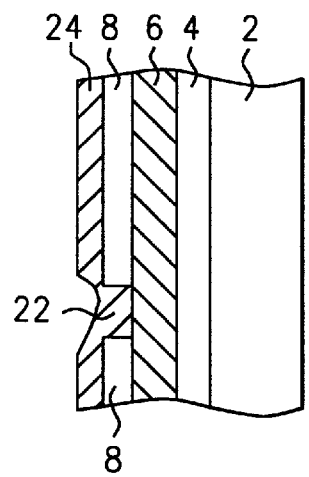

A first preferred embodiment of the present invention, is illustrated in FIG. 3a to FIG. 3l. Referring now to FIG. 3a and FIG. 3b, a first magnetic shield 6 is first deposited on a wafer substrate 2, as in the prior art. It is understood that shield 6 is usually separated from substrate 2 by a first dielectric film 4, which is typically 3 µm (micron) thick, but which may range from 1 µm to 10 µm. Optionally, one or more via holes (not shown) may be made through dielectric film 4, to connect shield 6 and substrate 2. It is understood that shield 6 can be either a contiguous piece over the entire substrate 2, or patterned into individual pieces (typically one piece per read head) at this stage of the process.

Figure 3E:
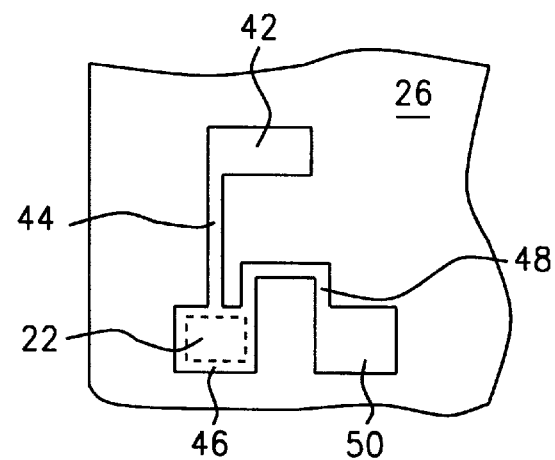
Figure 3F:
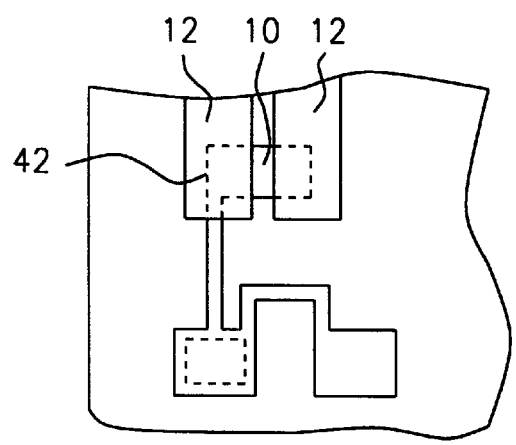
Figure 8A:
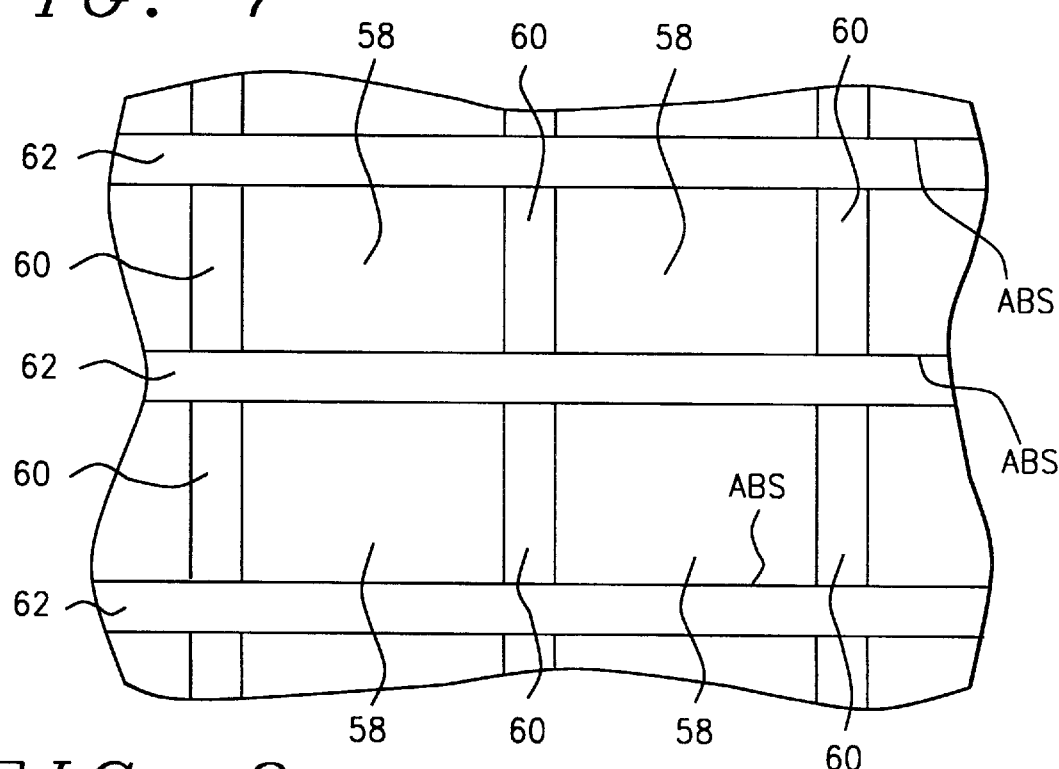
FIG. 8a shows a wafer plan view, illustrating the relative position of sliders, row-kerfs, and column-kerfs.

Next, a second thin dielectric film 8 is then deposited over the wafer surface, covering shield 6. As described earlier, thousands of substantially identical MR/GMR read heads are constructed on each wafer. The following description will be focused on a typical read head, unless otherwise specified. The first preferred embodiment consists of the following steps:

i. A via hole 22 is made through film 8, exposing shield 6 therein, as shown in FIG. 3a and FIG. 3b.

ii. A MR/GMR film 24 is deposited over the wafer surface, contacting shield 6 through via hole 22. See FIG. 3c and FIG. 3d.

iii. Film 24 is then patterned, using a mask and through an etch process. For each read head, a separate patch 26 is created as shown in FIG. 3e. In this illustrative example, patch 26 consists of five integral pieces: a top piece 42 which will be later patterned into the read sensor stripe 10; a bottom piece 46 covering the via hole 22 and electrically contacting shield 6; a first tab 44 connecting pieces 42 and 46; a right piece 50; and a second tab 48 connecting pieces 46 and 50. The number and shape of pieces is can vary to suit requirements and is for illustrative purposes only.

iv. Using a different mask, deposit two leads 12 on opposite sides of piece 42. Leads 12 and piece 42 are electrically connected upon deposition. Leads 12 define the width of sensor stripe 10. See FIG. 3f. Leads 12 also include magnetic layers providing longitudinal bias for the MR sensor (not shown).

v. Depositing third thin dielectric film 14 over the entire wafer surface. See FIG. 3g and FIG. 3h.

vi. Using a different mask, create a second via hole 52 through film 14 and expose portion of the piece 50. See FIG. 3i.

vii. Depositing a second magnetic shield 16 over the just formed structures. Shield 16 and bottom piece 46 are electrically connected through via 52, upon deposition. See FIG. 3j and FIG. 3k.

viii. The sensor stripe 10 and magnetic shields 6, 16 are now constructed as an integral part, i.e., items 6, 26, and 16 are a contiguous conductive structure. Proceed with normal wafer process. Dielectric films 8 and 14 are protected against dielectric breakdown all the way to the completion of wafer process.

ix. After the completion of wafer fabrication, all material below the air bearing surface (ABS) will be removed when the wafer is cut into rows (this is illustrated in FIGS. 8a/b). The electrical connection between sensor stripe 10 and shields 6, 16 are automatically removed.

The above process is shown as block diagram in FIG. 31.

Through the above description, the following advantages of the present invention become apparent by referring to FIG. 3a to FIG. 3l: First, the MR/GMR sensor stripe 10 and magnetic shields 6, 16 are constructed as a contiguous piece. Therefore, they are always in equipotential. Dielectric films 8 and 14 are never subject to an electrostatic field, hence immune to ESD throughout the wafer process. Second, the electrical connection between stripe 10 and shields 6, 16 are automatically removed during slider fabrication, creating a MR/GMR read head with isolated sensor stripe 10, which many disk drive manufacturers demand.

The present invention offers yet another advantage: Each shield 6 or 16 is connected to stripe 10 through tab 44 or 48, respectively. Since tabs 44 and 48 are formed from the MR/GMR thin film, it affords modest resistivity, which is low enough to maintain equipotential between stripe 10 and shields 6, 16, yet high enough to permit detection of an inadvertent electrical short across each of the dielectric films 8 and 14. Typically, the inadvertent short is caused by defects such as pinhole, residual of photo-resist, and re-deposition of etched material. It has relatively low resistance, usually below 100 Ohms, and rarely exceeding 10 kOhms. Advantageously, tabs 44 and 48 can be made with precisely known resistance, for example 1000±100 Ohms. Depending on the application, a resistance may be selected which can range from 100 to 5000 Ohms. An inadvertent short would shunt either tab 44 or tab 48, thereby reducing the corresponding tab resistance by a noticeable amount. By comparing measured tab resistance with the nominal value, and comparing the value of adjacent sliders, such an inadvertent short can be identified. Furthermore, whether the short exists across film 8 or 14 can also be identified. This information is useful for the failure analysis and process improvement.

Figure 3G:
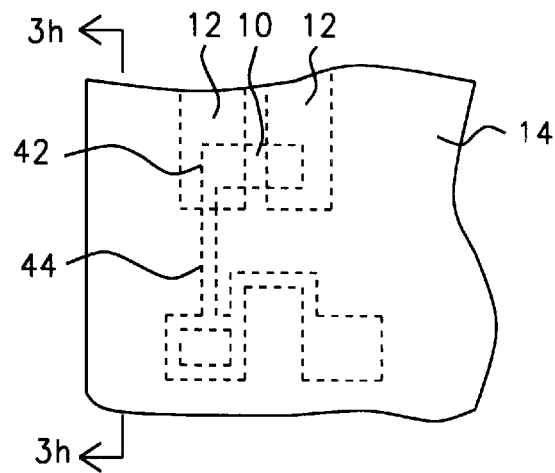
Figure 3H:
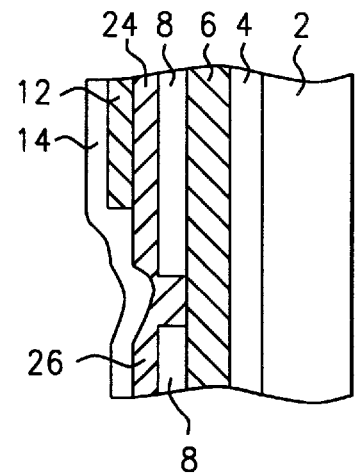
Figure 3I:
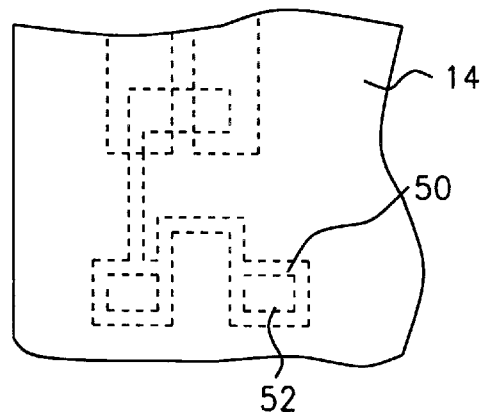
Figure 3J:
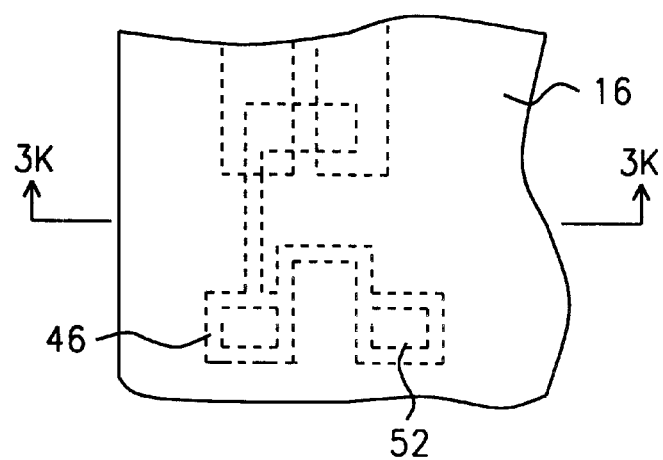
Figure 3K:
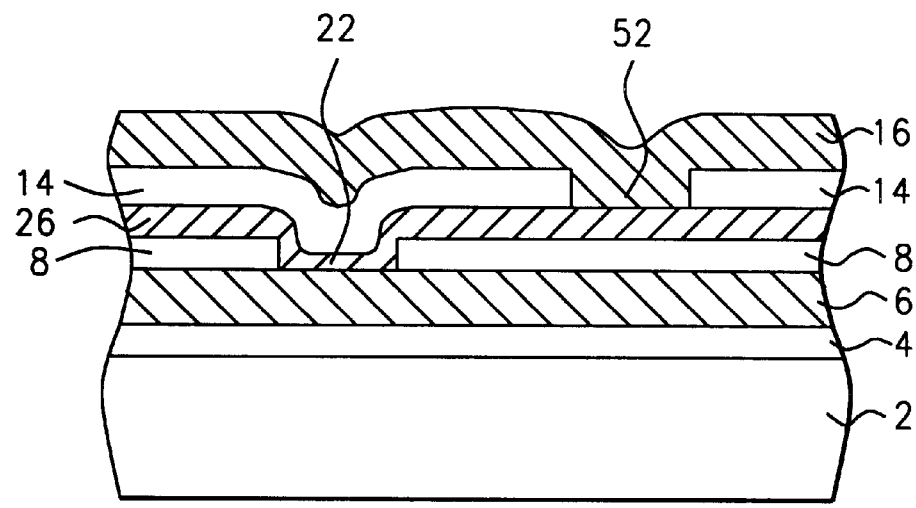
Figure 3L:
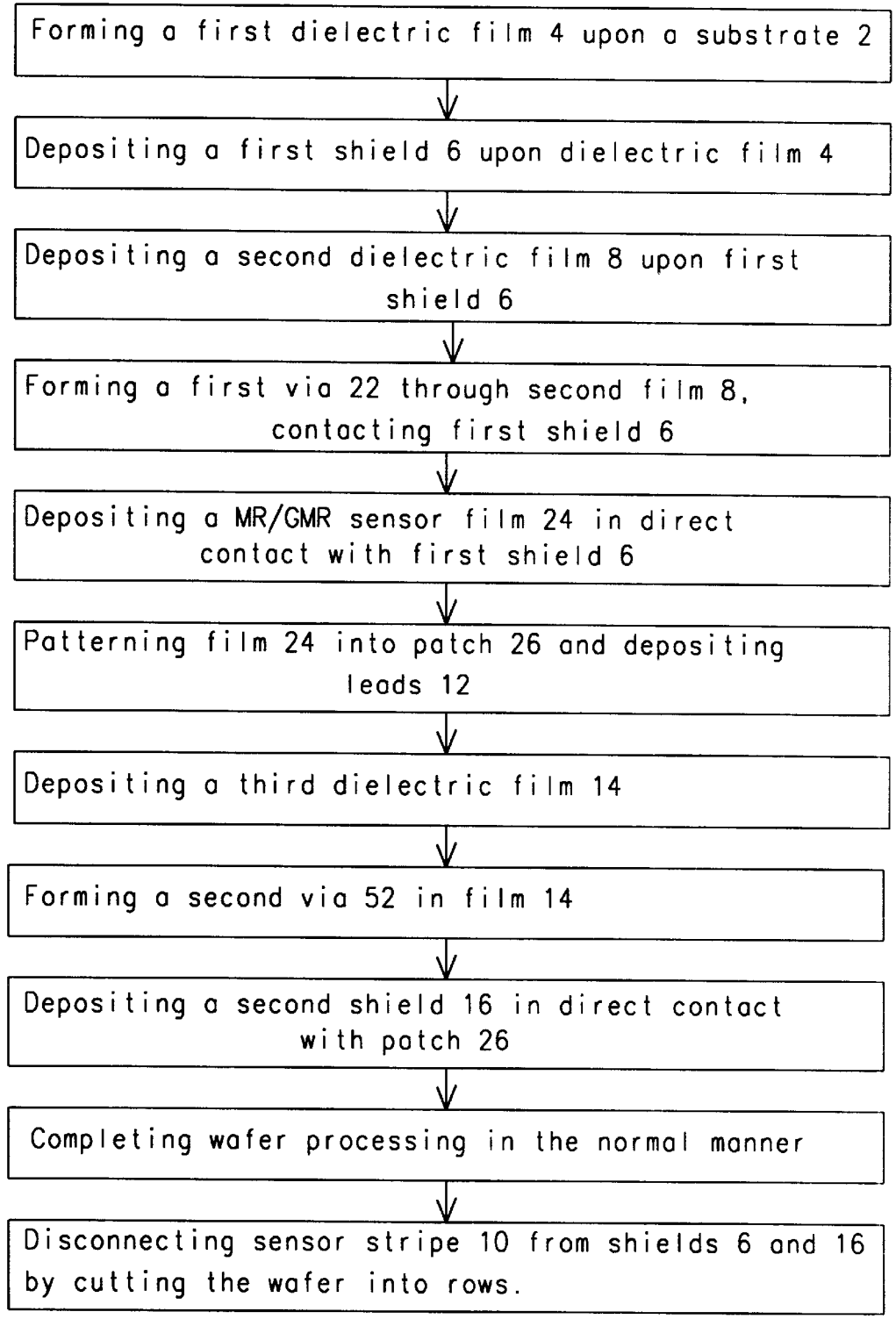

The first preferred embodiment described above is particularly suitable for MR/GMR heads with contiguous leads. A contiguous lead is constructed on top of a MR/GMR film 24, as shown in FIG. 3g and FIG. 3h. Therefore, the deposition of leads 12 in step iv described above does not sever the electrical connection between the top piece 42 and first tab 44. Presently most MR/GMR heads are built with abutted junctions, as shown in FIG. 1b. An abutted junction is constructed by first etching away the MR/GMR film in the area which will be occupied by leads 12. We next refer to FIG. 4a and FIG. 4b, where FIG. 4b is the cross-section 4b—4b of FIG. 4a. After the MR/GMR film is etched away, and before leads 12 are deposited, top piece 42 is electrically isolated from first tab 44 and shield 6. During this period of time the portion of film 8 directly under sensor stripe 10 is susceptible to dielectric breakdown, although photo-resist 11 provides some protection by keeping the static charge at a height above sensor stripe 10.

Figure 5:
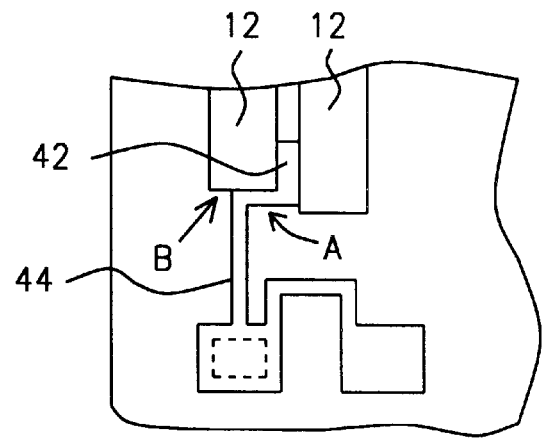
FIG. 5 shows an improvement over the first preferred embodiment, by extending the sensor stripe below at least one of the leads.

For MR/GMR heads with abutted leads, the first preferred embodiment may be improved by a second preferred embodiment by expanding the top piece 42 (see Arrow A), or reducing the length of left lead 12 (see Arrow B), as shown in FIG. 5, so that it is not disconnected from first tab 44 during the lead construction. This improvement is also applicable, however not required, for read heads with contiguous leads.

Figure 6:
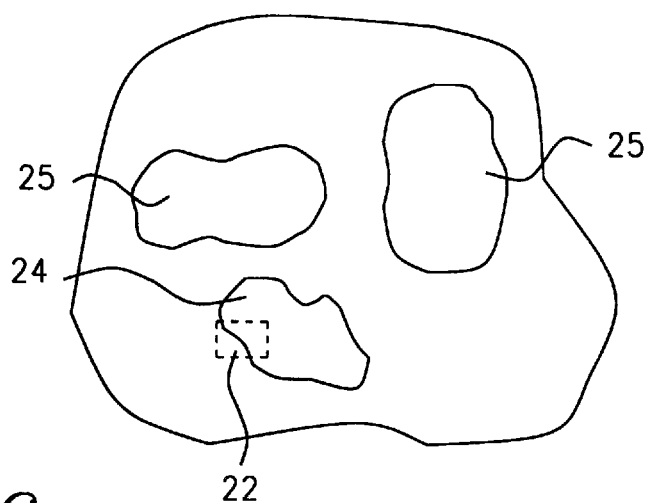
FIG. 6 shows a plan view of the MR/GMR film during initial phase of deposition. The film is not yet uniform and contiguous.
Figure 7:
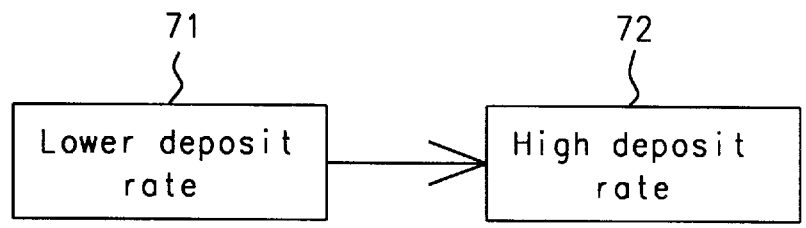
FIG. 7 shows a block diagram of deposition rate control which further enhances the present invention.

Referring back to FIG. 3c and FIG. 3d and examining more closely the electrical connection between MR/GMR film 24 and shield 6 it is apparent that, through via hole 22, film 24 is electrically connected to shield 6 as soon as film 24 is deposited. However, film 24 is not created instantly as a contiguous film. Due to slight spatial variation in the deposit rate, a multitude of isolated patches may exist during the initial phase of the deposition. It is also possible that at least one patch 25 of film 24 is located away from via hole 22 and temporarily isolated from shield 6 at the beginning of the deposition process, as illustrated in FIG. 6. As MR/GMR film 24 becomes thicker, it becomes contiguous and electrically connected to shield 6. To protect dielectric film 8 from breakdown, a novel process improvement is described now. The deposit rate of film 24 should be substantially lower (i.e., between 0.2 and 2 Å/second than the average deposit rate at the beginning of deposition) thereby reducing the rate of static charge built up and allowing the static charge to dissipate through the dielectric film 8, or to be neutralized by thermal electrons. This effectively reduces the electrostatic field in film 8, thus preventing dielectric breakdown at the beginning of the deposition. After film 24 becomes contiguous, typically when a few Å (Angstrom) thick, e.g., from 1 to 10 Å, the deposit rate can be raised substantially to a range from 0.5 to 5 Å/second to improve the throughput, without risk of dielectric breakdown. The novel process is shown as a block diagram in FIG. 7. Block 71 illustrates the period of lower deposit rate followed by Block 72, illustrating the period of higher deposit rate. The deposit rate may be raised either continuously (i.e., ramped) or in discrete steps (i.e., stepped). It is also applicable to the deposition of shield 16.

Figure 8B:
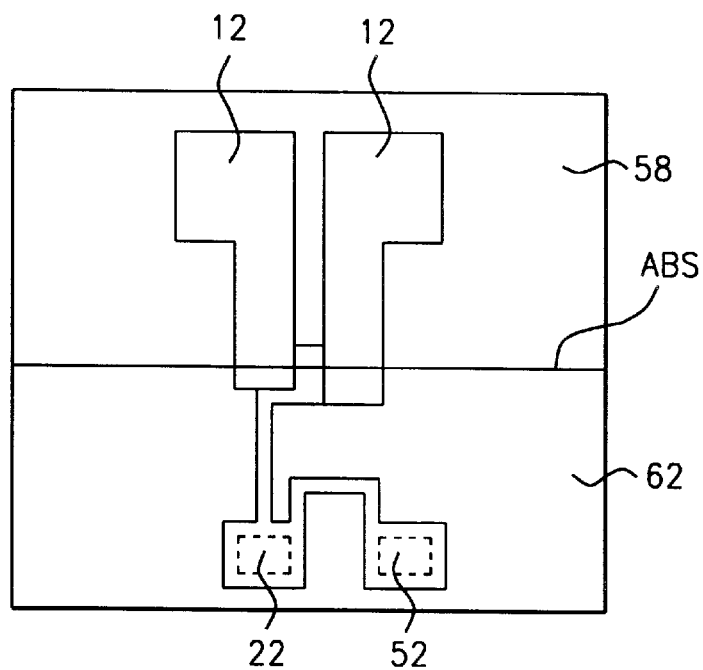
FIG. 8b represents one slider of FIG. 8a, showing a plan view of the first preferred embodiment of a slider in relation to a slider- and a row-kerf.

As noted above, the sensor stripe to shield connections in the first preferred embodiment are preserved throughout the wafer process. After the wafer fabrication is complete, the wafer is cut into rows and diced into sliders 58. Refer to FIG. 8a where four sliders 58 in a 2 by 2 array are depicted. The space between adjacent rows which will be consumed by cutting is called the row-kerf 62. Cutting of the row-kerf creates the air bearing surface (ABS). The space between adjacent sliders on the same row, also to be consumed by cutting, is called the column-kerf 60. In the first preferred embodiment, the sensor stripe-to-shield connections are removed when the wafer is cut into rows. This is why via holes 22 and 52 are located in row-kerfs 62, as shown in FIG. 8b.

Figure 9:
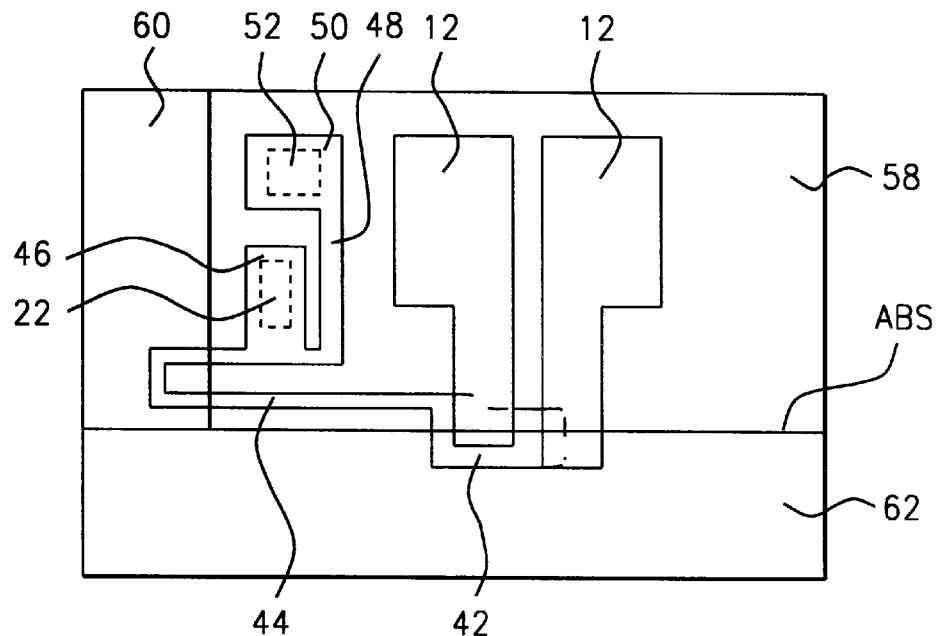
FIG. 9 shows an alternate layout of the MR/GMR patch, where the connection to both shields are routed through the column-kerf.

It is often desirable to keep the sensor stripe-to-shield connection until the rows are diced into sliders. This is because during the post-wafer fabrication, the rows are still subject to high electrostatic fields in the carbon overcoat (COC) and ABS etching processes. Although the electrostatic field in these processes can be reduced somewhat through process optimization and equipment improvement, it is more cost-effective to eliminate the hazard of dielectric breakdown by maintaining the sensor stripe to shield connection. For this purpose via holes 22 and 52 can be relocated away from the row-kerf 62, i.e., to the area above the ABS. It is understood that components shown in one Figure which are similar to components shown in another Figure are identified by the same reference numbers. To preserve real-estate in the column-kerf 60 (for other useful features such as electronic lapping guide, serial number, and alignment marks), via holes 22 and 52 may reside within the slider 58. In order to sever the sensor stripe-to-shield connections, first tab 44 may be routed through column-kerf 60, as illustrated in FIG. 9.

Figure 10:
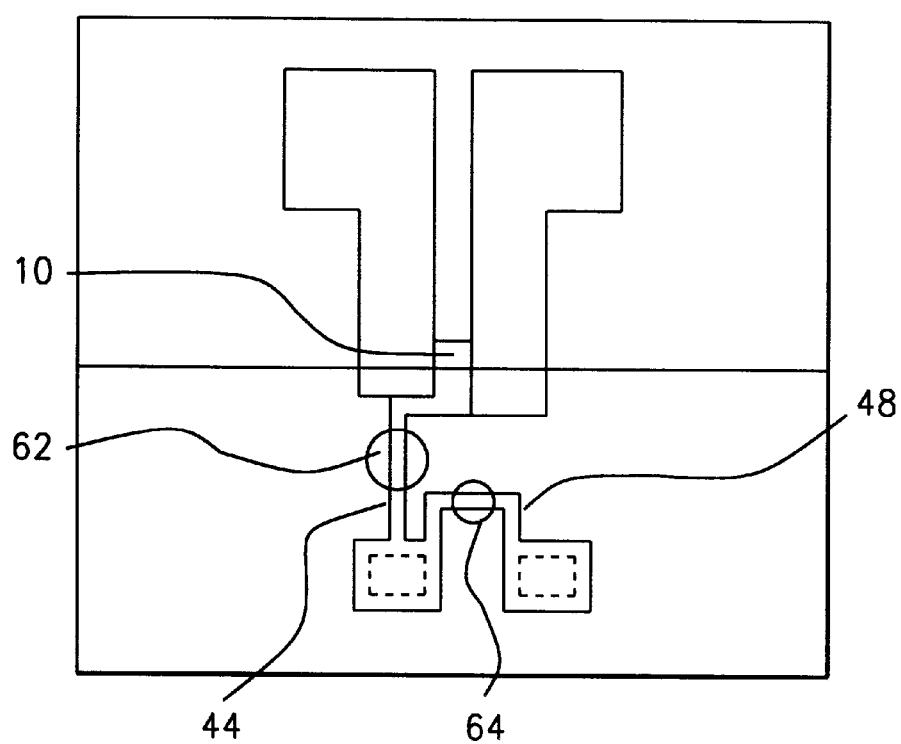
FIG. 10 shows a plan view of the first embodiment, with two additional via holes for the purpose of cutting off the connection to and between shields.

Occasionally, and primarily for the purpose of failure analysis, it is desirable to disconnect sensor stripe 10 from shields 6 and 16 during the wafer process. This can be accomplished in yet another preferred embodiment by creating a via hole 62 through first tab 44. An additional via hole 64 can also be created through 48, if it is desirable to disconnect shield 6 from shield 16 as well. See FIG. 10.

It will be understood by those skilled in the art that various changes in form and details may be made without departing from the spirit and scope of the invention. For example, tabs 44 and 48 can be made to have resistance values other than 1 kOhm. "Dead-shorts" of near zero resistance serve equally well the purpose of ESD protection, although they do not preserve the ability to detect inadvertent sensor stripe to shield shorts. Similarly, tab 48 can be eliminated, so that pieces 46 and 50 are merged into one piece, also via holes 22 and 52 overlap. This saves real estate in the wafer surface, while losing the capability to distinguish inadvertent shorts across dielectric films 8 and 14. Furthermore, if the MR/GMR sensors are designed such that film 24 lies on top of leads 12, the order of film 24 and leads 12 deposition, as described in the first preferred embodiment, has to be reversed accordingly.

While the invention has been particularly shown and described with reference to the preferred embodiment thereof, it will be understood by those skilled in the art that various changes in form and details may be made without departing from the spirit and scope of the invention.

What is claimed is:

1. A method of providing electrostatic discharge protection during MR/GMR head fabrication, comprising the steps of:
   forming a first dielectric film upon a substrate of a semiconductor wafer;
   depositing a first magnetic shield upon said first dielectric film;
   depositing a second dielectric film upon said first magnetic shield;
   forming a first via hole through said second dielectric film, contacting said first magnetic shield;
   depositing a MR/GMR sensor film thereby putting said MR/GMR sensor film in direct contact with said first magnetic shield;
   patterning said MR/GMR sensor film into a patch and depositing leads;
   depositing a third dielectric film upon said MR/MRG sensor film;
   forming a second via hole in said third dielectric film;
   depositing a second magnetic shield in direct contact with said patch thereby constructing said first and said second magnetic shield and said MR/GMR sensor film as a contiguous piece having the same electrostatic potential;
   completing wafer processing in the normal manner after depositing said second magnetic shield and forming a MR/GMR sensor stripe; and
   disconnecting said MR/GMR sensor stripe from said first and said second magnetic shield by cutting said semiconductor wafer into sliders.

2. The method of claim 1, wherein said patch provides electrically conductive means thereby effecting said contiguous piece.

3. The method of claim 1, wherein portions of said patch extending outside of said slider are cut off when said semiconductor wafer is cut into said sliders.

4. The method of claim 1, wherein said MR/GMR sensor film is deposited at a variable rate ranging from an initial lower deposit rate of 0.2 to 2 Å/second to a final higher deposit rate of 0.5 to 5 Å/second.

5. A method of providing electrostatic discharge protection during MR/GMR head fabrication, comprising the steps of:
   forming a first dielectric film upon a substrate of a semiconductor wafer surface;
   depositing a first magnetic shield upon said first dielectric film;
   depositing a second dielectric film over said semiconductor wafer surface covering said first magnetic shield;
   forming a first via hole in said second dielectric film, thereby exposing said first magnetic shield;
   depositing a MR/GMR sensor film over said semiconductor wafer surface, thereby contacting said first magnetic shield through said first via hole;
   patterning said MR/GMR sensor film, using a first mask and through an etch process, thus creating a separate patch on said MR/GMR sensor film for each of a plurality of read heads, each of said patches further comprising additional integral pieces: a top piece to be later patterned into a read sensor stripe, a bottom piece covering said first via hole, thereby electrically contacting said first magnetic shield, a first tab connecting said top piece and said bottom piece, a right piece, and a second tab connecting said bottom piece and said right piece;
   utilizing a second mask, depositing a first lead and a second lead on top of said top piece, thus creating a sensor stripe;
   including magnetic layers with said first lead and said second lead to also provide longitudinal bias for said sensor stripe;
   connecting electrically said first lead, said second lead and said top piece;
   depositing a third dielectric film over said semiconductor wafer surface;
   using a third mask, creating a second via hole through said third dielectric film, thus exposing a portion of said right piece;
   depositing a second magnetic shield over the just formed structures, whereby said second magnetic shield and said bottom piece are electrically connected through said second via hole, said first magnetic shield, said second magnetic shield, and said sensor stripe forming an integral part;
   proceeding next with normal wafer processing;
   cutting said semiconductor wafer into rows after the completion of wafer fabrication, thereby removing all material below an air bearing surface (ABS) and thus automatically removing the electrical connection between said sensor stripe, said first and said second magnetic shield; and
   dicing said rows along a column-kerf, thus creating a plurality of sliders.

6. The method of claim 5, wherein said first dielectric film has a thickness ranging from 1 to 10 micrometers.

7. The method of claim 5, wherein the spacing from said first lead to said second lead defines the width of said sensor stripe.

8. The method of claim 5, wherein said first magnetic shield is connected to said sensor stripe through said first tab.

9. The method of claim 5, wherein said second magnetic shield is connected to said sensor stripe through said second tab.

10. The method of claim 5, wherein said first tab and said second tab each have a resistance ranging from 100 to 5000 Ohms.

11. The method of claim 5, wherein said first tab and said second tab extend below said ABS.

12. The method of claim 5, wherein said first tab and said second tab are severed automatically after wafer production, when said semiconductor wafer is cut into said rows.

13. The method of claim 5, wherein, in the alternative, said first tab extends sideways beyond the width of said slider.

14. The method of claim 13, wherein said first tab is located above said ABS.

15. The method of claim 13, wherein said first tab is severed automatically when said rows are diced into said sliders.

16. The method of claim 13, wherein said first and said second via hole reside within said slider.

17. The method of claim 5, wherein said top piece is extended downwards so as to project beyond said left lead.

18. The method of claim 5, wherein said left lead is reduced in length so as to expose in part said top piece.

19. The method of claim 5, wherein a third via hole is created through said first tab to disconnect said sensor stripe from said first magnetic shield.

20. The method of claim 5, wherein a fourth via hole is created through said second tab to disconnect said sensor stripe from said second magnetic shield.

21. The method of claim 5, wherein said MR/GMR sensor film is deposited at a variable rate ranging from an initial lower deposit rate of 0.2 to 2 Å/second to a final higher deposit rate of 0.5 to 5 Å/second.

22. The method of claim 21, wherein said variable deposit rate is continuous.

23. The method of claim 21, wherein said variable deposit rate is discrete steps.

* * * * *